US012732111B2

(12) United States Patent
Mishima et al.

(10) Patent No.: US 12,732,111 B2
(45) Date of Patent: Sep. 8, 2026

(54) INSULATED RESONANCE CIRCUIT DEVICE PROVIDED WITH LC RESONANCE CIRCUITS AND CONTROL CIRCUIT CONTROLLING RECTIFIER CIRCUIT USING SYNCHRONIZATION SIGNAL

(71) Applicant: OMRON Corporation, Kyoto (JP)

(72) Inventors: Taichi Mishima, Kyoto (JP); Yuki Ito, Kyoto (JP); Shingo Nagaoka, Kyoto (JP); Takeshi Uematsu, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 767 days.

(21) Appl. No.: 18/009,031

(22) PCT Filed: May 21, 2021

(86) PCT No.: PCT/JP2021/019441

§ 371 (c)(1),
(2) Date: May 30, 2023

(87) PCT Pub. No.: WO2021/256174

PCT Pub. Date: Dec. 23, 2021

(65) Prior Publication Data

US 2023/0275503 A1 Aug. 31, 2023

(30) Foreign Application Priority Data

Jun. 18, 2020 (JP) ................................ 2020-105481

(51) Int. Cl.
*H02M 3/335* (2006.01)
*H02M 3/00* (2006.01)
*H02J 50/12* (2016.01)

(52) U.S. Cl.
CPC ......... *H02M 3/33569* (2013.01); *H02M 3/01* (2021.05); *H02J 50/12* (2016.02)

(58) Field of Classification Search
CPC ................................ H02J 50/12; H02M 3/335
See application file for complete search history.

(56) References Cited

U.S. PATENT DOCUMENTS

2019/0288607 A1* 9/2019 Zong ................. H02M 3/33584

FOREIGN PATENT DOCUMENTS

GB 2258060 A * 1/1993 ............. H02M 7/00
JP 2014176173 A 9/2014

(Continued)

OTHER PUBLICATIONS

International Search Report for International Application No. PCT/JP2021/019441; Mailing Date, Aug. 3, 2021.

(Continued)

*Primary Examiner* — Peter M Novak
(74) *Attorney, Agent, or Firm* — CANTOR COLBURN LLP

(57) ABSTRACT

In an insulated resonance circuit device, a first resonance circuit includes first and second LC resonance circuits electromagnetically coupled to each other and electrically insulated from each other, oscillates at a predetermined first resonance frequency based on an input AC voltage, and outputs an oscillation signal voltage. The second resonance circuit having a second resonance frequency substantially identical to the first resonance frequency resonates with the oscillation signal voltage to detect the oscillation signal voltage, and outputs the detected oscillation signal voltage. A control circuit compare the oscillation signal voltage from the second resonance circuit with a comparison signal voltage for obtaining a predetermined target output voltage and/or a predetermined target output current to generate and output gate signals for controlling a rectifier circuit.

14 Claims, 12 Drawing Sheets

(56) References Cited

FOREIGN PATENT DOCUMENTS

| | | | |
|---|---|---|---|
| JP | 2016063699 | A | 4/2016 |
| JP | 6201388 | B2 | 9/2017 |

OTHER PUBLICATIONS

PCT Written Opinion of the International Searching Authority for International Application No. PCT/JP2021/019441; Mailing Date, Aug. 3, 2021.
EPO Extended European Search Report for corresponding EP application No. 21824917.5 dated Jun. 7, 2024; 10 pages.
Liu Yeran et al., “Zero-Phase-Angle Controlled Bidirectional Wireless EVCharging Systems for Large Coil Misalignments”, IEEE Transactions Onpower Electronics, Institute of Electrical and Electronicsengineers, vol. 35, No. 5, Sep. 16, 2019, pp. 5343-5353, U.S.A.
Xin Liu, “A Novel Synchronization Technique for Wireless Power Transfer Systems”, Electronics, vol. 7, No. 11, Nov. 13, 2018, pp. 1-20, Basel, Switzerland.
EPO Examination for corresponding EP Application No. 21824917.5; issued Nov. 28, 2025.
SIPA Office Action for corresponding CN Application No. 202180039954.1; issued Nov. 27, 2025.
Yongbin Jiang et al: “A Novel Synchronization Technique for High Frequency Rectifier in Wireless Power Transfer”, 10th International Conference onPower Electronics—ECCE ASIA, May 27-30, 2019, Busan, Korea.

* cited by examiner

Vin
11
PFC CIRCUIT
12
INVERTER CIRCUIT
12C
100
200
13
C1
L1
21
14
C2
C3
L2
Is1
33
31
Vs1
R1
L3
Vr1
32
22
301
15
Q1
Q2
Q3
Q4
S1
S2
S3
S4
Lg1
Lg2
16
17
34
35
Io
Vo
CONTROL CIRCUIT
30
4
S1~S4

PFC CIRCUIT
INVERTER CIRCUIT
CONTROL CIRCUIT
Vin
11
12
12C
13
C1
L1
100
200A
21A
14
C2
C3
L2
R1
L3
Vr1
32
22
Is1
33
31
Vs1
15
Q1
Q2
Q3
Q4
S1
S2
S3
S4
Lg1
Lg2
8
S1~S4
S11~S14
30B
Vr2
302
16
17
35
Io
Vo
34
14A
C12
C13
L12
R11
L13
Is2
43
41
Vs2
15A
22A
Q11
Q12
Q13
Q14
S11
S12
S13
S14
Lg11
Lg12
42
30B

PFC CIRCUIT
INVERTER CIRCUIT
CONTROL CIRCUIT
Vin
11
12
12C
13
14
15
16
17
21
22
23
30
31
32
33
34
35
100A
200
303
C1
L1
L2
C2
C3
C21
R21
L23
R1
L3
Is1
Vs1
Vr1
Io
Vo
Q1
Q2
Q3
Q4
Lg1
Lg2
S1
S2
S3
S4
4
S1~S4

INSULATED RESONANCE CIRCUIT DEVICE PROVIDED WITH LC RESONANCE CIRCUITS AND CONTROL CIRCUIT CONTROLLING RECTIFIER CIRCUIT USING SYNCHRONIZATION SIGNAL

CROSS REFERENCE TO RELATED APPLICATIONS

This is the U.S. national stage of application No. PCT/JP2021/019441, filed on May 21, 2021. Priority under 35 U.S.C. § 119 (a) and 35 U.S.C. § 365 (b) is claimed from Japanese Application No. 2020-105481, filed Jun. 18, 2020, the disclosure of which is also incorporated herein by reference.

TECHNICAL FIELD

The present invention relates to an insulated resonance circuit device including a plurality of LC resonance circuits and a control circuit electrically insulated from each other, for example, and a contactless power supply system including the insulated resonance circuit device.

BACKGROUND ART

Conventionally, a moving body such as an automatic guided vehicle (AGV) is mounted with a rechargeable battery such as a lithium ion battery. When the rechargeable battery is charged, after the AGV is moved to a charging station, a power receiving coil mounted on the AGV is electromagnetically coupled to a power transmitting coil of a charging station to perform non-contact charging in a non-contact charging system.

PRIOR ART DOCUMENT

Patent Document

[Patent Document 1] Japanese Patent No. JP6201388B2

SUMMARY OF THE INVENTION

Problems to be Solved by the Invention

However, the non-contact charging system has the following two problems as illustrated in FIG. 10.

(Problem 1) When the positional relationship between the power transmission coil and the power receiving coil changes, the inductance changes, a resonance frequency $f_r$ changes, and switching frequencies $f_{sw}$ and $f_r$ do not match to each other, which adversely affects the efficiency and the like. As a result, in order to make the switching frequency coincide with the resonance frequency, a mechanism for controlling a drive circuit of a switching element is required. In addition, since output characteristics such as an output voltage and an output current of a charging circuit change due to a change in inductance, the circuit design and control for satisfying a charging profile of the rechargeable battery become complicated.

(Problem 2) A load varies depending on a remaining amount of the rechargeable battery, and as a result, output characteristics such as an output voltage and an output current of the charging circuit vary. This complicates circuit design and control for satisfying the charging profile of the rechargeable battery.

In this case, the problems 1 and 2 can be solved by, for example, the technology disclosed in Patent Document 1, but the following other problems occur.

For example, it is necessary to add a control circuit for a circuit of a power transmitter device or a circuit of a power receiver device in order to control output characteristics of the contactless power supply system. In addition, it is also necessary to use a wireless communication system for this control. Therefore, there is such a problem that the output characteristics of the circuit cannot be controlled due to an increase in the circuit size due to an increase in the number of components and a delay or interruption of communication.

An object of the present invention is to provide an insulated resonance circuit device that solves the above problems, does not require complicated control for solving the two problems, and can reduce a part of the device (a control circuit of power transmitter device, a communication system for controlling power transmitter device, or the like) for controlling output characteristics only by adding a simple circuit as compared with the prior art, and a contactless power supply system using the insulated resonance circuit device.

Means for Solving the Problems

According to one aspect of the present invention, there is provided an insulated resonance circuit device including first and second resonance circuits, a rectifier circuit, and a control circuit. The first resonance circuit includes first and second LC resonance circuits electromagnetically coupled to each other and electrically insulated from each other, is configured to oscillate at a predetermined first resonance frequency based on an input AC voltage and generate and output an oscillation signal voltage. The rectifier circuit includes a plurality of switching elements and is configured to switch the oscillation signal voltage according to a plurality of predetermined gate signals, then smooth the oscillation signal voltage, and output a predetermined DC voltage to a load. The second resonance circuit has a second resonance frequency substantially identical to the first resonance frequency, is configured to resonate with the oscillation signal voltage to detect the oscillation signal voltage and output the detected oscillation signal voltage. The control circuit is configured to compare the oscillation signal voltage from the second resonance circuit with a comparison signal voltage for obtaining a predetermined target output voltage and/or a predetermined target output current to generate the plurality of gate signals for controlling the rectifier circuit, and outputs the plurality of gate signals to the rectifier circuit.

Effect of the Invention

Therefore, according to the insulated resonance circuit device and the like of the present invention, by adding the second LC resonance circuit to the power receiver device, it is possible to reduce a part of the device (a control circuit of power transmitter device, a communication system for controlling power transmitter device, or the like) for controlling the output characteristics. As a result, the configuration is simple, and the manufacturing cost can be significantly reduced as compared with the prior art.

BRIEF DESCRIPTION OF THE DRAWINGS

FIG. 8A is a circuit diagram illustrating a configuration example of an LC resonance circuit 13 of FIG. 1 and the like.

MODE FOR CARRYING OUT THE INVENTION

Figure 1:
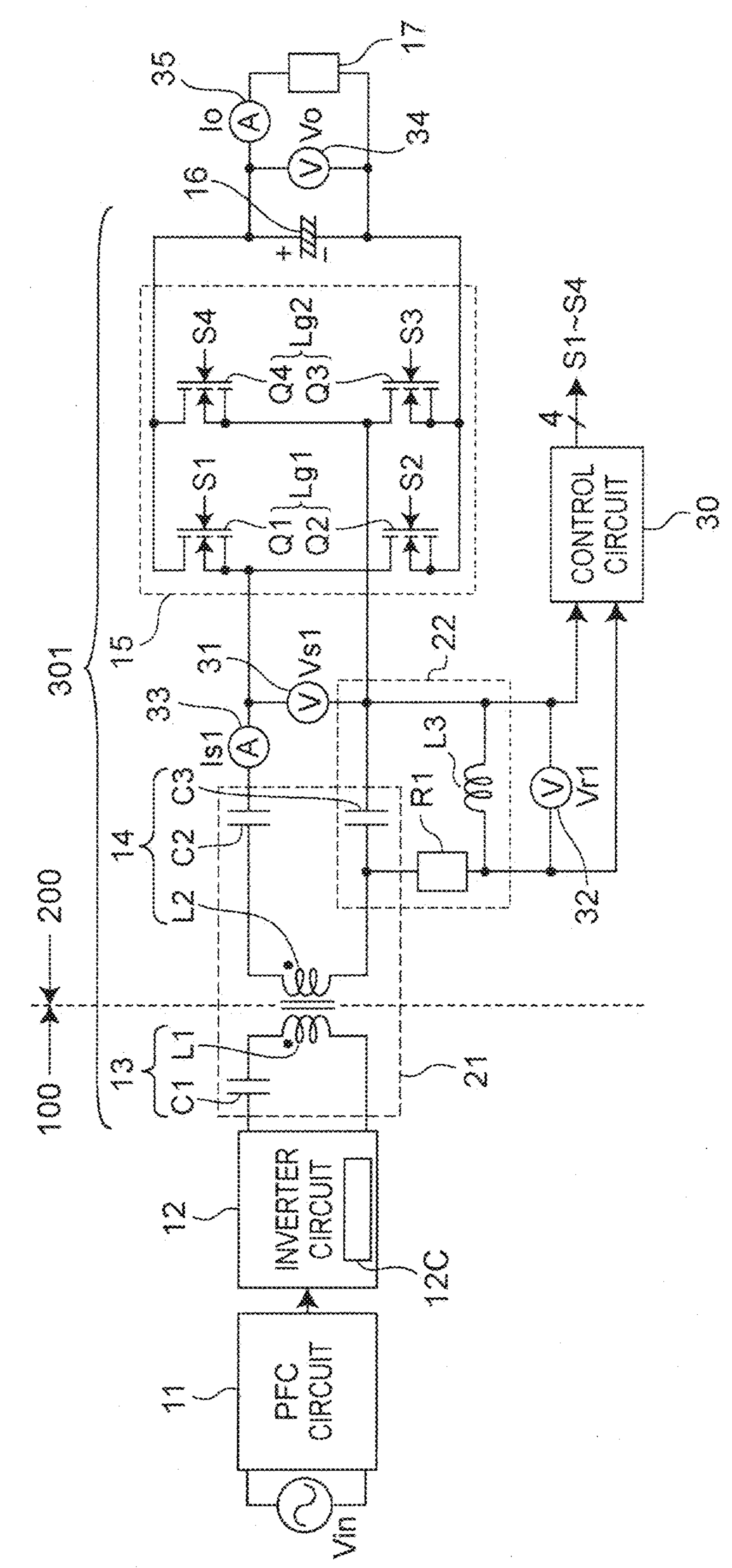
FIG. 1 is a block diagram illustrating a configuration example of a contactless power supply system according to a first embodiment.

Hereinafter, embodiments according to the present invention will be described with reference to the drawings. The same or similar components are denoted by the same reference numerals.

Findings of Inventors

In the following embodiments, an insulated resonance circuit device, a control method thereof, and a contactless power supply system capable of achieving desired output characteristics (output voltage characteristics and/or output current characteristics) with respect to a degree of coupling between a power transmitter device and a power receiver device and load variation by controlling a circuit of the power receiver device only by information of the power receiver device without requiring communication between the power transmitter device and the power receiver device will be described below.

In order to solve the above-described problems in the prior art, the embodiment according to the present invention is characterized in that a rectifying inverter circuit included in a power receiver device is controlled only on the basis of information of the power receiver device. In this case, the following configurations are provided.

(1) When the positional relationship between the power transmission coil of the power transmitter device and the power receiving coil of the power receiver device varies, the inductance changes or the coupling degree changes, and a phase difference between a gate signal of an inverter circuit of the power transmitter device and a gate signal of a rectifier circuit (inverter circuit) of the power receiver device changes.

(2) This phase difference is detected by a second resonance circuit connected to a resonance circuit of the power receiver device, and a predetermined phase difference that has desired output characteristics (output voltage or output current) with respect to a variation in load and a variation in inductance or coupling degree is calculated.

(3) A control circuit of the power receiver device controls frequencies and a phase difference of the gate signals for driving the inverter circuit. At this time, there are the following two control methods.

(Control Method A) A phase difference between a gate signal of an inverter circuit of a power transmitter device and a gate signal of a rectifying inverter circuit, output characteristics of which are independent of a variation in inductance, coupling degree, or load, is calculated, and the gate signal of the rectifying inverter circuit is controlled based on the phase difference. This is disclosed in a first embodiment.

(Control Method B) A predetermined phase difference between legs of the rectifying inverter circuit, output characteristics of which are independent of a variation in inductance, coupling degree, or load, is calculated, and the gate signal of the rectifying inverter circuit is controlled based on the phase difference. This is disclosed in a second embodiment.

(4) As a result, communication between the power transmitter device and the power receiver device is unnecessary, and it is possible to control the inductance, the coupling degree, and the load variation to desired output characteristics (output voltage or output current).

Hereinafter, a control circuit and a control method according to each of embodiments and modified embodiments of the present invention will be described. All the following embodiments and modified embodiments are examples for carrying out the present invention, and the present invention is not limited thereto.

First Embodiment

FIG. 1 is a block diagram illustrating a configuration example of a contactless power supply system according to the first embodiment.

Referring to FIG. 1, the contactless power supply system according to the first embodiment includes a power transmitter device 100 and a power receiver device 200. In this case, the power transmitter device 100 is configured to include a power factor correction circuit (hereinafter, referred to as a PFC circuit) 11, an inverter circuit 12, and a power transmission LC resonance circuit 13. On the other hand, the power receiver device 200 is configured to include a power receiving LC resonance circuit 14, an inverter circuit 15, a smoothing electrolytic capacitor 16, a load 17, a control circuit 30, and a second resonance circuit 22 which is a voltage detection LCR resonance circuit. The power transmission LC resonance circuit 13 and the power receiving LC resonance circuit 14 configure a first resonance circuit 21. In addition, the inverter circuit 15 and the electrolytic capacitor 16 configure a rectifier circuit. The power receiver device 200 further includes voltage detectors 31, 32, and 34 and current detectors 33 and 35.

In this case, the LC resonance circuit 13 is configured to include, for example, a series circuit of a capacitor C1 and an inductor L1, and the LC resonance circuit 14 is configured to include, for example, a series circuit of capacitors C2 and C3 and an inductor L2. In addition, the second resonance circuit 22 is configured to include a series circuit of an inductor L3, the capacitor C3, and a resistor R1, and is configured to have a resonance frequency substantially identical to the oscillation frequency of the first resonance circuit 21.

In addition, the resonance circuits 13, 14, and 22, the inverter circuit 15, the electrolytic capacitor 16, and the control circuit 30 configure an insulated resonance circuit device 301 according to the present invention. In addition, since the power transmitter device 100 and the power receiver device 200 are located close to each other for power supply such as charging, the inductor L1 of the LC resonance circuit 13 and the inductor L2 of the LC resonance circuit 14 are electromagnetically coupled to each other with a predetermined coupling degree and electrically insulated from each other.

In the power transmitter device 100, the PFC circuit 11 converts an input voltage Vin, which is an AC voltage from an AC power supply such as a commercial AC power supply, into a DC voltage, performs a power factor improvement process on the input voltage using a predetermined power factor improvement method, then performs DC-DC conversion on the input voltage into a predetermined DC voltage, and outputs the DC voltage to the inverter circuit 12. The inverter circuit 12 generates an AC voltage by switching the DC voltage from the PFC circuit 11 and outputs the AC voltage to the LC resonance circuit 13. The LC resonance circuit 13 generates AC power including an AC voltage resonated at a predetermined resonance frequency $f_r$ based on the input AC voltage and having the resonance frequency $f_r$ and transmits the generated AC power to the LC resonance circuit 14 coupled to the LC resonance circuit 13.

Figure 2A:
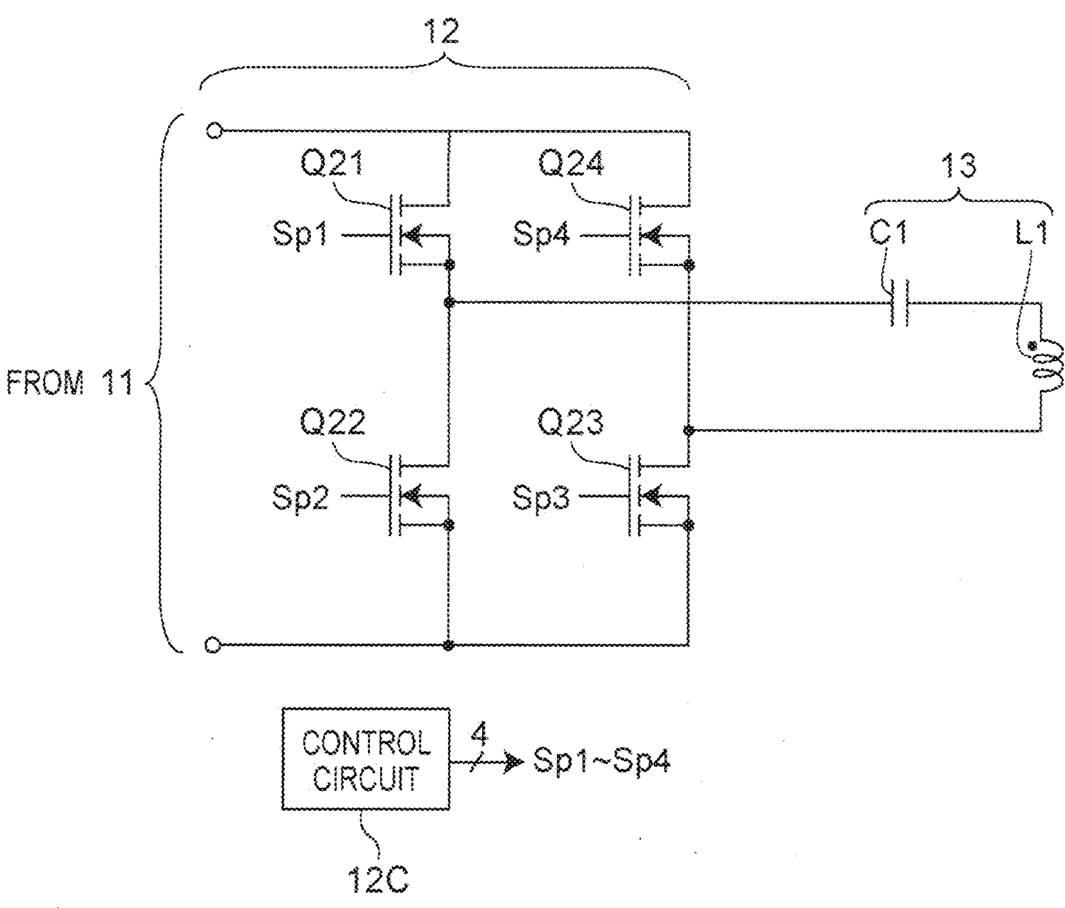
FIG. 2A is a circuit diagram illustrating a configuration example of an inverter circuit 12 of FIG. 1.
Figure 3:
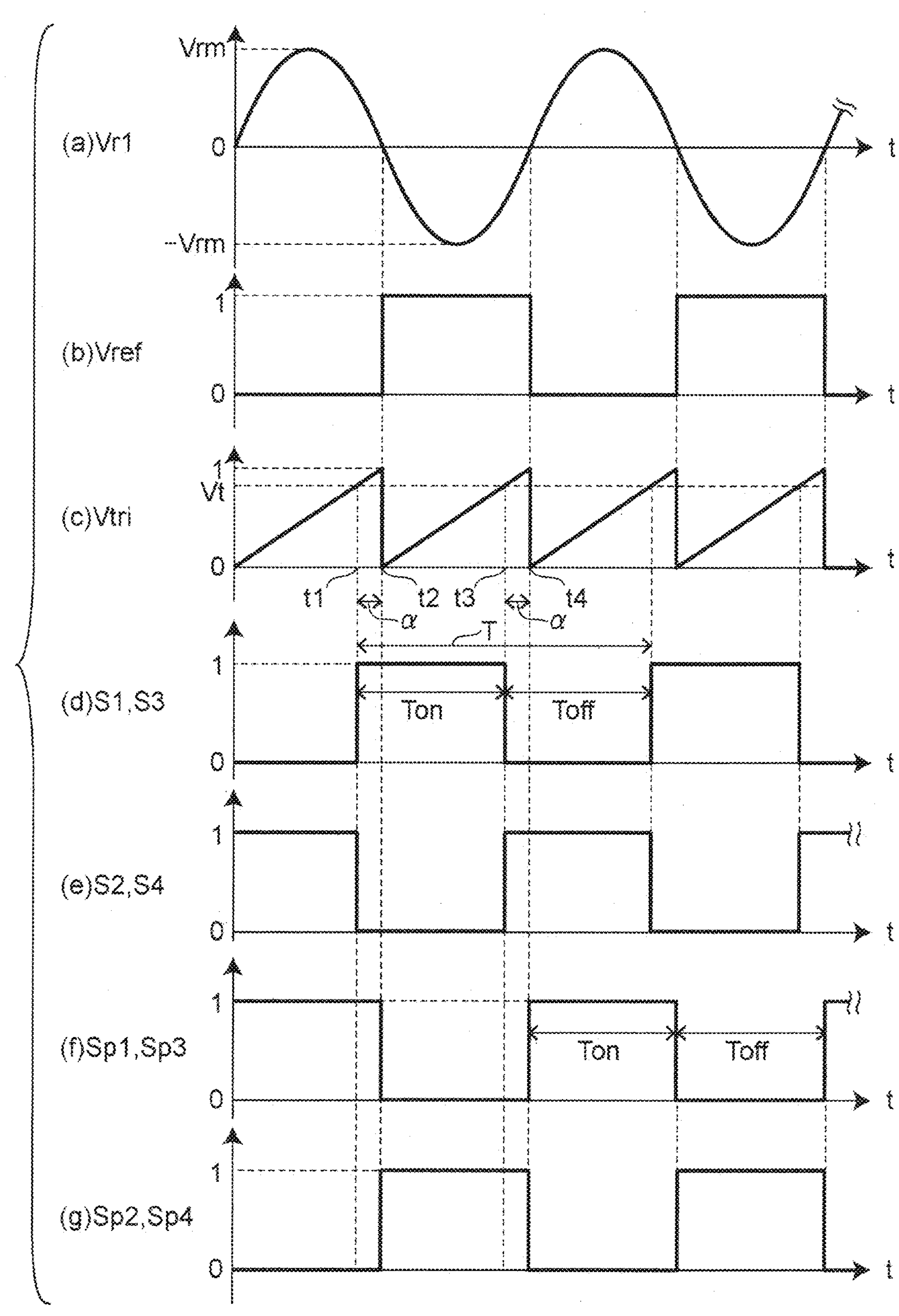
FIG. 3 is a timing chart of voltages and signals showing operation examples of the contactless power supply system of FIG. 1.

FIG. 2A is a circuit diagram illustrating a configuration example of the inverter circuit 12 of FIG. 1. Referring to FIG. 2A, the inverter circuit 12 is configured to include four MOS transistors Q21 to Q24, which are switching elements, is connected in a bridge form, and further includes a control circuit 12C. In this case, the MOS transistors Q21 and Q24 are high-side (high-voltage side) switching elements, and the MOS transistors Q22 and Q23 are low-side (low-voltage side) switching elements. The four MOS transistors Q21 to Q24 are on/off controlled by four gate signals Sp1 to Sp4 from the control circuit 12C input to gates (an example of a control terminal). As illustrated in FIG. 3, the gate signals Sp1 and Sp3 are the same gate signals having a duty ratio of 50%, for example, while the gate signals Sp2 and Sp4 are the same gate signals having a duty ratio of 50%, for example, and are inverted signals of the gate signals Sp1 and Sp3. The duty ratio of the gate signals Sp1 to Sp4 is not limited to 50% and may be a set value of other duty ratios.

In the power receiver device 200, the LC resonance circuit 14 receives the AC power from the LC resonance circuit 13, and outputs an AC voltage of the AC power to the load 17 via the inverter circuit 15 and the electrolytic capacitor 16 configuring the rectifier circuit. In this case, the inverter circuit 15 is configured by connecting four MOS transistors Q1 to Q4, which are switching elements, in a bridge form. In this case, the MOS transistors Q1 and Q4 are high-side (high-voltage side) switching elements, and the MOS transistors Q2 and Q3 are low-side (low-voltage side) switching elements. The four MOS transistors Q1 to Q4 are on/off controlled by four gate signals S1 to S4 from the control circuit 30 input to gates (an example of a control terminal). In this case, the MOS transistors Q1 and Q2 are referred to as a leg Lg1, and the MOS transistors Q3 and Q4 are referred to as a leg Lg2.

The voltage from the inverter circuit 15 is smoothed by the electrolytic capacitor 16 to be rectified to a predetermined DC voltage, and then output to the load 17. A DC-DC converter that changes a DC voltage may be provided between the electrolytic capacitor 16 and the load 17.

The voltage detector 31 detects an output voltage Vs1 of the LC resonance circuit 14, and the current detector 33 detects an output current Is1 of the LC resonance circuit 14. The voltage detector 32 detects an oscillation signal voltage Vr1 which is an output voltage of the second resonance circuit 22. The voltage detector 34 detects an output voltage Vo of the inverter circuit 15 and the electrolytic capacitor 16 (rectifier circuit), and the current detector 35 detects an output current Io of the inverter circuit 15 and the electrolytic capacitor 16 (rectifier circuit).

In the first embodiment of FIG. 1, it is characterized in that, in particular, as compared with the prior art, the second resonance circuit 22 is further provided. The second resonance circuit 22 detects the oscillation signal voltage Vr1 oscillated by a first resonance circuit 21A and outputs the oscillation signal voltage Vr1 to the control circuit 30, and the control circuit 30 compares the oscillation signal voltage Vr1 with a comparison signal voltage Vt for obtaining a predetermined target output voltage and/or a predetermined target output current, the four gate signals S1 to S4 for driving the MOS transistors Q1 to Q4 of the inverter circuit 15 are generated.

Figure 2B:
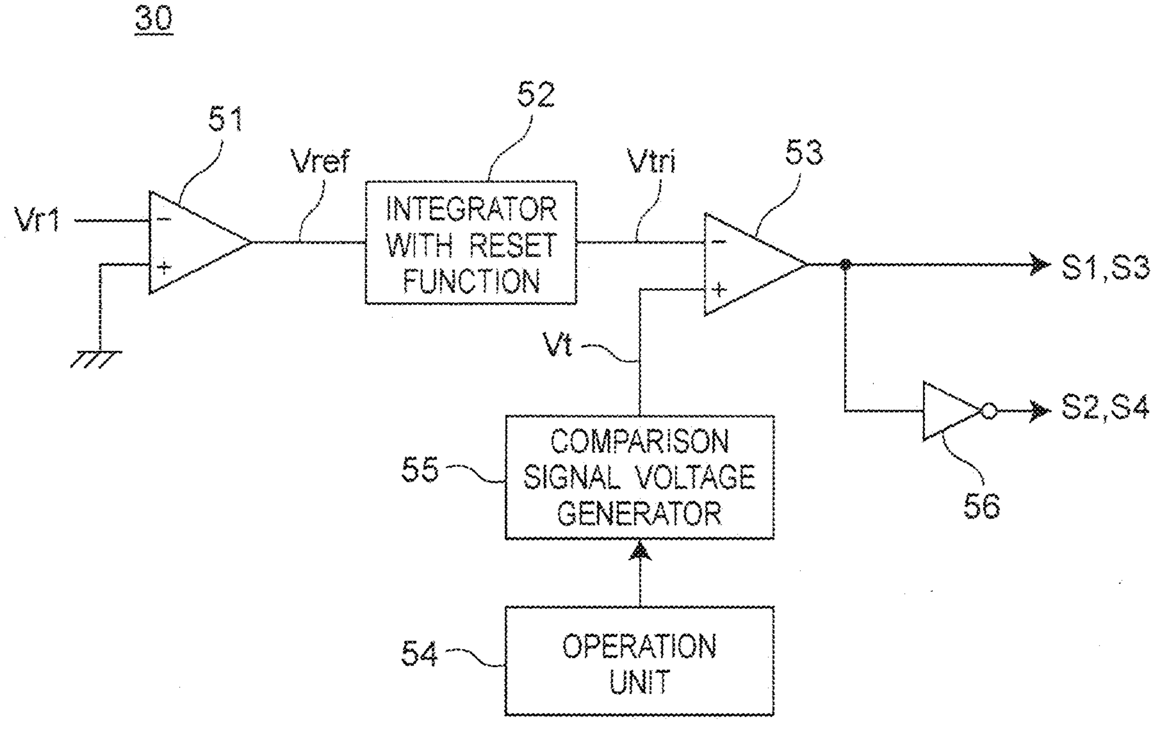
FIG. 2B is a block diagram illustrating a configuration example of a control circuit 30 of FIG. 1.

FIG. 2B is a block diagram illustrating an example of a configuration of the control circuit 30 of FIG. 1. Note that the configuration of the control circuit 30 of FIG. 1 is not limited thereto. That is, the configuration, various setting values, and the following description of FIG. 2B are merely examples, and the present invention is not limited thereto.

Referring to FIG. 2B, the control circuit 30 is configured to include comparators 51 and 53, an integrator 52 with reset function, an operation unit 54, a comparison signal voltage generator 55, and an inverter 56.

The comparator 51 compares the oscillation signal voltage Vr1 detected by the second resonance circuit 22 with the ground voltage, generates a reference signal voltage Vref as a comparison result, and outputs the reference signal voltage Vref to the integrator 52 with the reset function. The integrator 52 with the reset function generates a triangular wave signal voltage Vtri, that is a synchronization signal voltage synchronized with the reference signal voltage Vref after the output voltage is reset to the ground voltage zero V at the falling of the reference signal voltage Vref, is repeated with a cycle of T/2 that is a half of a cycle T of the reference signal voltage Vref, increases at a predetermined slope, and is reset to the ground voltage (0 V), and outputs the generated voltage to the inverting input terminal of the comparator 53.

On the other hand, the comparison signal voltage generator 55 generates, for example, the comparison signal voltage Vt for obtaining the predetermined target output voltage and/or the predetermined target output current set by the user using the operation unit 54, and outputs the comparison signal voltage Vt to a non-inverting input terminal of the comparator 53. In this case, the target voltage Vt has, for example, a voltage lower than the maximum value of the triangular wave signal voltage Vtri. The comparator 53 compares the input triangular wave signal voltage Vtri with the comparison signal voltage Vt, generates comparison result signals as the gate signals S1 and S3, and generates the gate signals S2 and S4 that are inverted from the comparison result signals from the gate signals S1 and S3 via the inverter 56. These gate signals S1 to S4 are applied to the gates of the MOS transistors Q1 to Q4 of the inverter circuit 15, and the MOS transistors Q1 to Q4 are subjected to on-off drive control. In this case, the gate signals S1 to S4 have, for example, a rectangular pulse shape.

In the example of the configuration of the control circuit 30 of FIG. 1 illustrated in FIG. 2B configured as described above, the reference signal Vref is generated based on the oscillation signal voltage Vr1 from the second resonance circuit 22, the reference signal Vref is compared with the comparison signal voltage Vt for obtaining the predetermined target output voltage and/or the predetermined target output current, so that a phase difference a between the gate signal of the inverter circuit 12 of the power transmitter device 100 and the gate signal of the inverter circuit 15 of the power receiver device 200 is calculated, the gate signals S1 to S4 are generated based on the calculated phase difference a, and the inverter circuit 15 is controlled to operate at the phase difference a using the gate signals S1 to S4, so that the control circuit 30 performs control to obtain the predetermined target output voltage and/or the predetermined target output current.

FIG. 3 is a timing chart of voltages and signals showing operation examples of the contactless power supply system of FIG. 1.

As is clear from FIG. 3, the reference signal voltage Vref has, for example, a rectangular pulse shape, and is generated to be synchronized with the oscillation signal voltage Vr1. The reference signal voltage Vref is synchronized with the gate signals Sp2 and Sp4 of the inverter circuit 12 of the power transmitter device 100 and is synchronized with the inverted signals of the gate signals Sp1 and Sp3.

The triangular wave signal voltage Vtri is generated to be synchronized with the reference signal voltage Vref, is reset to the ground voltage 0 V at the falling of the reference signal voltage Vref, and then increases at a predetermined slope. In this case, when the triangular wave signal voltage Vtri reaches the comparison signal voltage Vt for obtaining the predetermined target output voltage and/or the predetermined target output current at time t1 which is a timing before reset time t2 at which the triangular wave signal voltage Vtri falls by a predetermined time interval a, the gate signals S1 and S3 are turned on, while the gate signals S2 and S4 are turned off. Next, when the triangular wave signal voltage Vtri reaches the comparison signal voltage Vt at time t3 which is a timing before reset time t4 at which the triangular wave signal voltage Vtri falls by the predetermined time interval a, the gate signals S1 and S3 are turned off, while the gate signals S2 and S4 are turned on. This operation is repeated in the cycle T.

That is, the gate signals S1 and S3 are identical to each other, and the gate signals S2 and S4 are identical to each other. In addition, the gate signals S2 and S4 are inverted signals of the gate signals S1 and S3. Therefore, in the same legs Lg1 and Lg2, the pair of gate signals (S1 and S2) (S3 and S4) have an inverted relationship with each other.

In the above embodiment, the output voltage Vo is controlled, but the present invention is not limited thereto, and the output current Io may be controlled. The same applies to the following embodiments and modified embodiments.

As described above, according to the present embodiment, the second resonance circuit 22 that detects the oscillation signal voltage of the first resonance circuit 21 is further provided, and the oscillation signal voltage Vr1 detected by the second resonance circuit 22 is detected and output to the control circuit 30. The control circuit 30 compares the oscillation signal voltage Vr1 with the comparison signal voltage Vt for obtaining the predetermined target output voltage and/or the predetermined target output current, so that the four gate signals S1 to S4 for driving the MOS transistors Q1 to Q4 of the inverter circuit 15 are generated. The inverter circuit 15 is controlled by the gate signals S1 to S4 so that the output voltage Vo becomes the predetermined target output voltage and/or the output current Io becomes the predetermined target output current.

With the above configuration, a mechanism used for communicating the control information between the power transmitter device 100 and the power receiver device 200 and a mechanism for controlling the characteristics of the output voltage or the output current to a desired value with respect to the inductance and the coupling degree, or the load variation are unnecessary. In this case, since the wireless communication system is not used, an uncontrollable state due to delay or interruption of communication does not occur, and a protection circuit or the like is not required. As a result, the configuration is simple, and the manufacturing cost can be significantly reduced as compared with the prior art.

Second Embodiment

Figure 4:
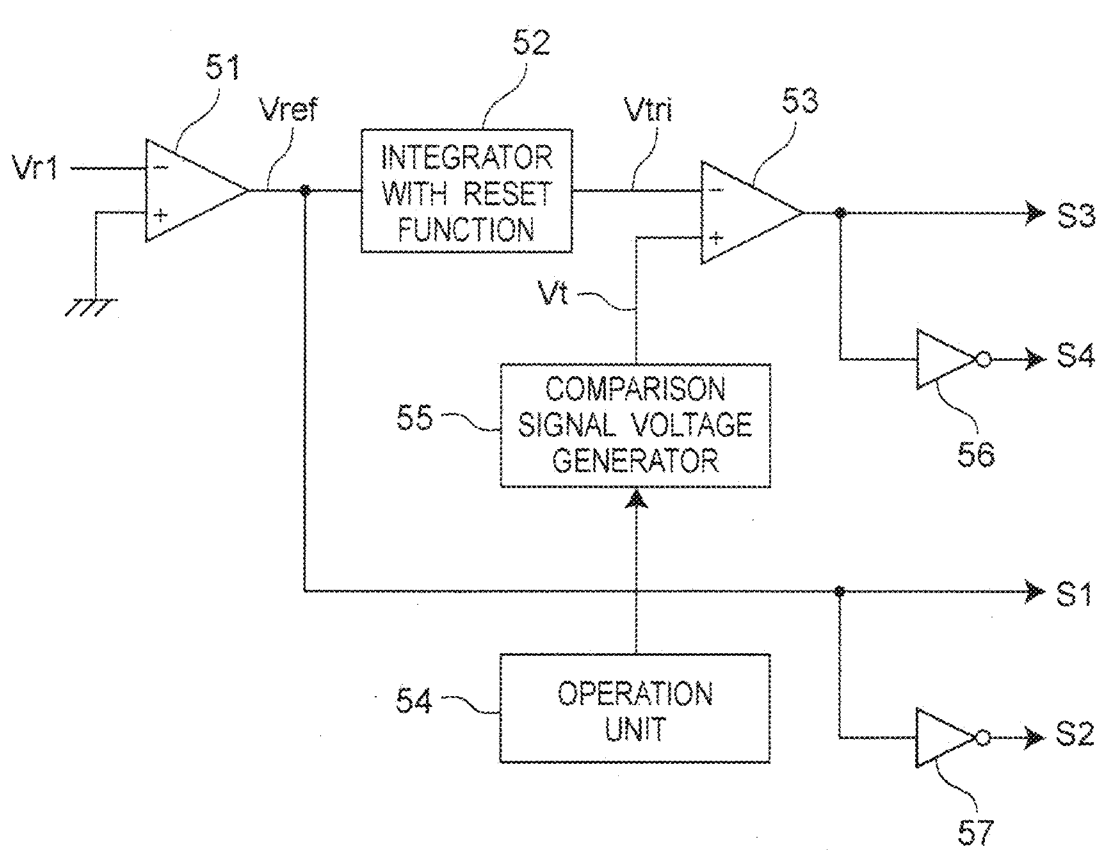
FIG. 4 is a block diagram illustrating a configuration example of a control circuit 30A used in a contactless power supply system according to a second embodiment.

FIG. 4 is a block diagram illustrating a configuration example of a control circuit 30A used in a contactless power supply system according to the second embodiment. The contactless power supply system according to the second embodiment is different from the contactless power supply system according to the first embodiment in FIG. 1 in the following points.

(1) Instead of the control circuit 30, the control circuit 30A of FIG. 4 is provided.

(2) The control circuit 30A further includes an inverter 57 as compared with the control circuit 30 of FIG. 2B.

The differences will be described below.

Referring to FIG. 4, a comparator 53 outputs a gate signal S3 and outputs a gate signal S4 via an inverter 56. In addition, the comparator 51 outputs a reference signal voltage Vref as a gate signal S1 and outputs the reference signal voltage Vref as a gate signal S2 via the inverter 57. These gate signals S1 to S4 are applied to gates of MOS transistors Q1 to Q4 of the inverter circuit 15, respectively.

Figure 5:
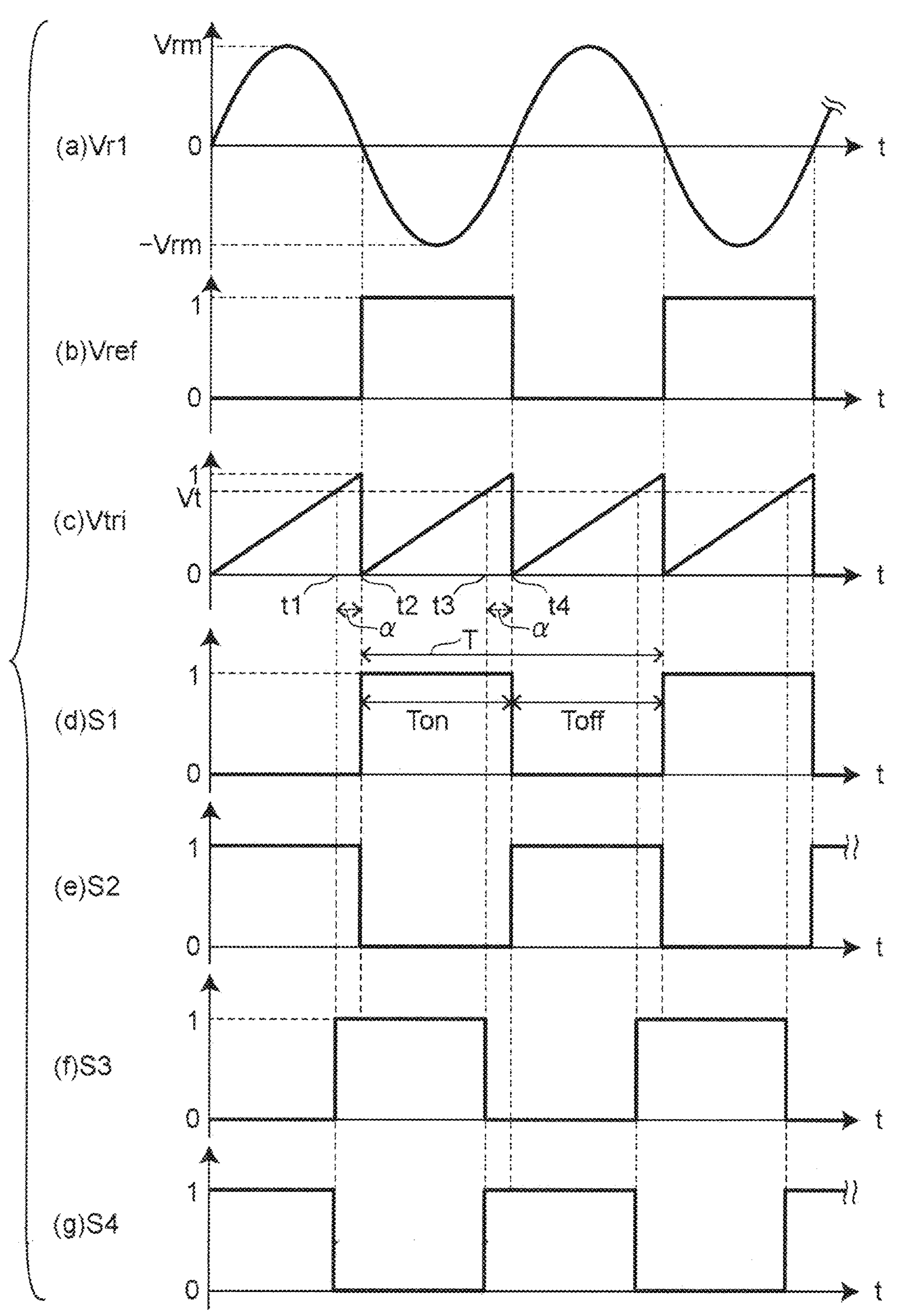
FIG. 5 is a timing chart of voltages and signals showing operation examples of the contactless power supply system of FIG. 4.

FIG. 5 is a timing chart of voltages and signals showing operation examples of the contactless power supply system of FIG. 4.

As is apparent from FIG. 5, the reference signal voltage Vref and the triangular wave signal voltage Vtri are generated in a manner similar to that of the first embodiment in FIG. 3. In this case, when the triangular wave signal voltage Vtri reaches a comparison signal voltage Vt for obtaining the predetermined target output voltage and/or the predetermined target output current at time t1 which is a timing before reset time t2 at which the triangular wave signal voltage Vtri falls by a predetermined time interval a, the gate signal S3 is turned on, while the gate signal S4 is turned off. In addition, the gate signal S1 is the same synchronization signal as the reference signal voltage Vref, and the gate signal S2 is an inverted signal of the gate signal S1. Next, when the triangular wave signal voltage Vtri reaches the comparison signal voltage Vt at time t3 which is a timing before reset time t4 at which the triangular wave signal voltage Vtri falls by the predetermined time interval a, the gate signal S3 is turned off, while the gate signal S4 is turned on. This operation is repeated in the cycle T.

That is, the gate signal S2 is an inverted signal of the gate signal S1, and the gate signal S4 is an inverted signal of the gate signal S3. Therefore, in each of the same legs Lg1 and Lg2, the pair of gate signals (S1 and S2) (S3 and S4) have an inverted relationship with each other, but in the different legs Lg1 and Lg2, the gate signal S1 is delayed from the gate signal S3 by the time interval a, and the gate signal S2 is delayed from the gate signal S4 by the time interval a.

As described above, according to the present embodiment, the second resonance circuit 22 that detects the oscillation signal voltage of the first resonance circuit 21 is further provided, and an oscillation signal voltage Vr1 detected by the second resonance circuit 22 is detected and output to the control circuit 30A. The control circuit 30A compares the oscillation signal voltage Vr1 with the comparison signal voltage Vt for obtaining the predetermined target output voltage and/or the predetermined target output current, so that the four gate signals S1 to S4 for driving the MOS transistors Q1 to Q4 of the inverter circuit 15 are generated. The inverter circuit 15 is controlled by the gate signals S1 to S4 so that an output voltage Vo becomes the predetermined target output voltage and/or an output current Io becomes the predetermined target output current.

That is, by generating the reference signal Vref based on the oscillation signal voltage Vr1 from the second resonance circuit 22 and comparing the reference signal Vref with the comparison signal voltage Vt, a phase difference between the switching elements (S1 and S3; S2 and S4) corresponding to the legs Lg1 and Lg2 is calculated, the gate signals S1 to S4 are generated based on the calculated phase difference, and control is performed to obtain a predetermined target output voltage and/or a target output current.

With the above configuration, a mechanism used for communicating the control information between a power transmitter device 100 and a power receiver device 200A and a mechanism for controlling the characteristics of the output voltage or the output current to a desired value with respect to the inductance and the coupling degree, or the load variation are unnecessary. In this case, since the wireless communication system is not used, an uncontrollable state due to delay or interruption of communication does not occur, and a protection circuit or the like is not required. As a result, the configuration is simple, and the manufacturing cost can be significantly reduced as compared with the prior art.

Third Embodiment

Figure 6:
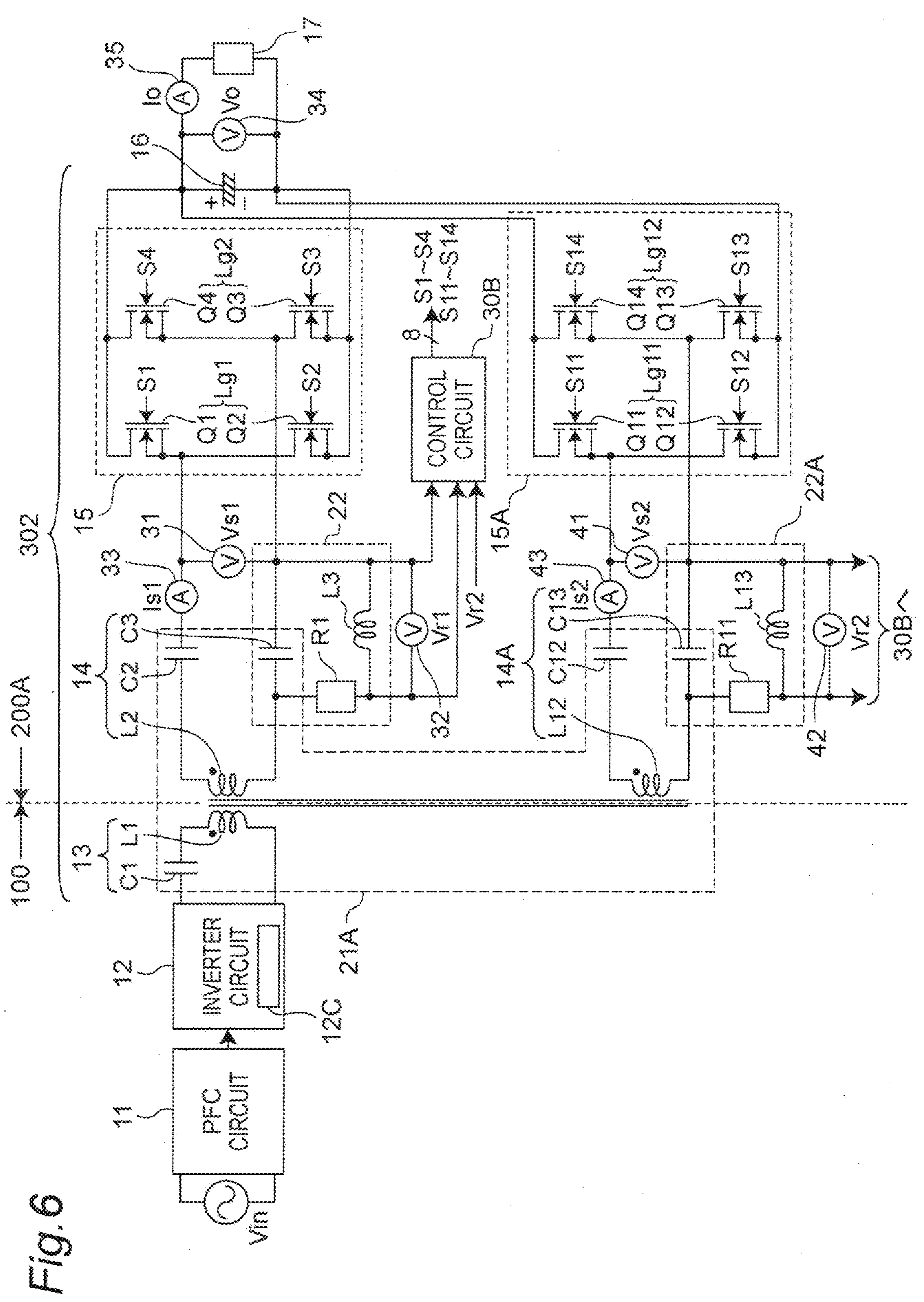
FIG. 6 is a block diagram illustrating a configuration example of a contactless power supply system according to a third embodiment.

FIG. 6 is a block diagram illustrating a configuration example of a contactless power supply system according to a third embodiment. The contactless power supply system according to the third embodiment is different from the contactless power supply system according to the first embodiment in FIG. 1 in the following points.

(1) A power receiver device 200A is provided instead of the power receiver device 200.

(2) As compared with the power receiver device 200, the power receiver device 200A includes a control circuit 30B instead of the control circuit 30, and further includes an LC resonance circuit 14A, another second resonance circuit 22A, an inverter circuit 15A, voltage detectors 31 and 42, and a current detector 33.

That is, the contactless power supply system according to the third embodiment is characterized in that the two second resonance circuits 22 and 22A and the two inverter circuits 15 and 15A are provided and connected in parallel. Differences will be described below.

Referring to FIG. 6, the resonance circuits 13, 14, 14A, 22, and 22A, the inverter circuits 15 and 15A, an electrolytic capacitor 16, and the control circuit 30B configure an insulated resonance circuit device 302 according to the present invention. In addition, the resonance circuits 13, 14, and 14A configure a first resonance circuit 21A. In this case, a power transmitter device 100 and the power receiver device 200A are located close to each other for power supply such as charging, for example, so that an inductor L1 of the LC resonance circuit 13, an inductor L2 of the LC resonance circuit 14, and an inductor L12 of the LC resonance circuit 14A are electromagnetically coupled to each other with a predetermined coupling degree.

The LC resonance circuit 14A is configured to include a series circuit of the inductor L12 and capacitors C12 and C13. In addition, the another second resonance circuit 22A is configured to include a series circuit of a resistor R11, an inductor L13, and the capacitor C13, and is configured to have a resonance frequency substantially identical to the oscillation frequency of the first resonance circuit 21.

In a manner similar to that of the inverter circuit 15, the inverter circuit 15A is configured by connecting four MOS transistors Q11 to Q14, which are switching elements, in a bridge form. In this case, the MOS transistors Q11 and Q14 are high-side (high-voltage side) switching elements, and the MOS transistors Q12 and Q13 are low-side (low-voltage side) switching elements. The four MOS transistors Q11 to Q14 are on/off controlled by four gate signals from the control circuit 30B. In this case, the MOS transistors Q11 and Q12 are referred to as a leg Lg11, and the MOS transistors Q13 and Q14 are referred to as a leg Lg12.

The voltage from the inverter circuits 15 and 15A is smoothed by the electrolytic capacitor 16 to be rectified to a predetermined DC voltage, and then output to a load 17.

A voltage detector 41 detects an output voltage Vs2 of the LC resonance circuit 14A, and a current detector 43 detects an output current Is2 of the LC resonance circuit 14. The voltage detector 42 detects an output voltage Vr2 of another second resonance circuit 22A.

In the third embodiment configured as described above, based on the detection voltage Vr2 in addition to an oscillation signal voltage Vr1, the control circuit 30B uses the circuit of FIG. 2B or FIG. 4 according to the control method A or B to execute:

(1) comparing a detection voltage Vr1 with a comparison signal voltage Vt for obtaining a predetermined target output voltage and/or a predetermined target output current to generate four gate signals S1 to S4 for driving MOS transistors Q1 to Q4 of the inverter circuit 15, and controlling the inverter circuit 15, and (2) comparing the detection voltage Vr2 with a comparison signal voltage Vt for obtaining a predetermined target output voltage and/or a predetermined target output current to generate four gate signals S11 to S14 for driving the MOS transistors Q11 to Q14 of the inverter circuit 15A and controlling the inverter circuit 15A.

As a result, the control circuit 30B performs control such that an output voltage Vo becomes a predetermined target output voltage and/or an output current Io becomes a predetermined target output current.

With the above configuration, a mechanism used for communicating the control information between the power transmitter device 100 and the power receiver device 200 or 200A and a mechanism for controlling the characteristics of the output voltage or the output current to a desired value with respect to the inductance and the coupling degree, or the load variation are unnecessary. In this case, since the wireless communication system is not used, an uncontrollable state due to delay or interruption of communication does not occur, and a protection circuit or the like is not required. As a result, the configuration is simple, and the manufacturing cost can be significantly reduced as compared with the prior art.

In the third embodiment, it is characterized in that, in the power receiver device 200A, the two second resonance circuits 22 and 22A and the two inverter circuits 15 and 15A are provided and connected in parallel. Specific effects of the third embodiment are as follows.

For example, in a case where the power receiver device 200A is configured to include a circuit that operates in multiple phases due to an increase in power or the like, there is a problem that the currents between the respective phases become unbalanced. However, as a method of simplifying the control processing for the inverter circuits 15 and 15A, the above problem can be solved by configuring the power receiver device 200A to have a so-called multi-configuration and performing phase control. That is, according to the configuration of the third embodiment, it is possible to extremely simplify a part of a conventional complicated control circuit for improving current imbalance in addition to downsizing the entire circuit by improving efficiency.

In the third embodiment described above, the two second resonance circuits 22 and 22A and the two inverter circuits 15 and 15A are used, but the present invention is not limited thereto, and three or more circuits may be used and connected in parallel.

Fourth Embodiment

Figure 7:
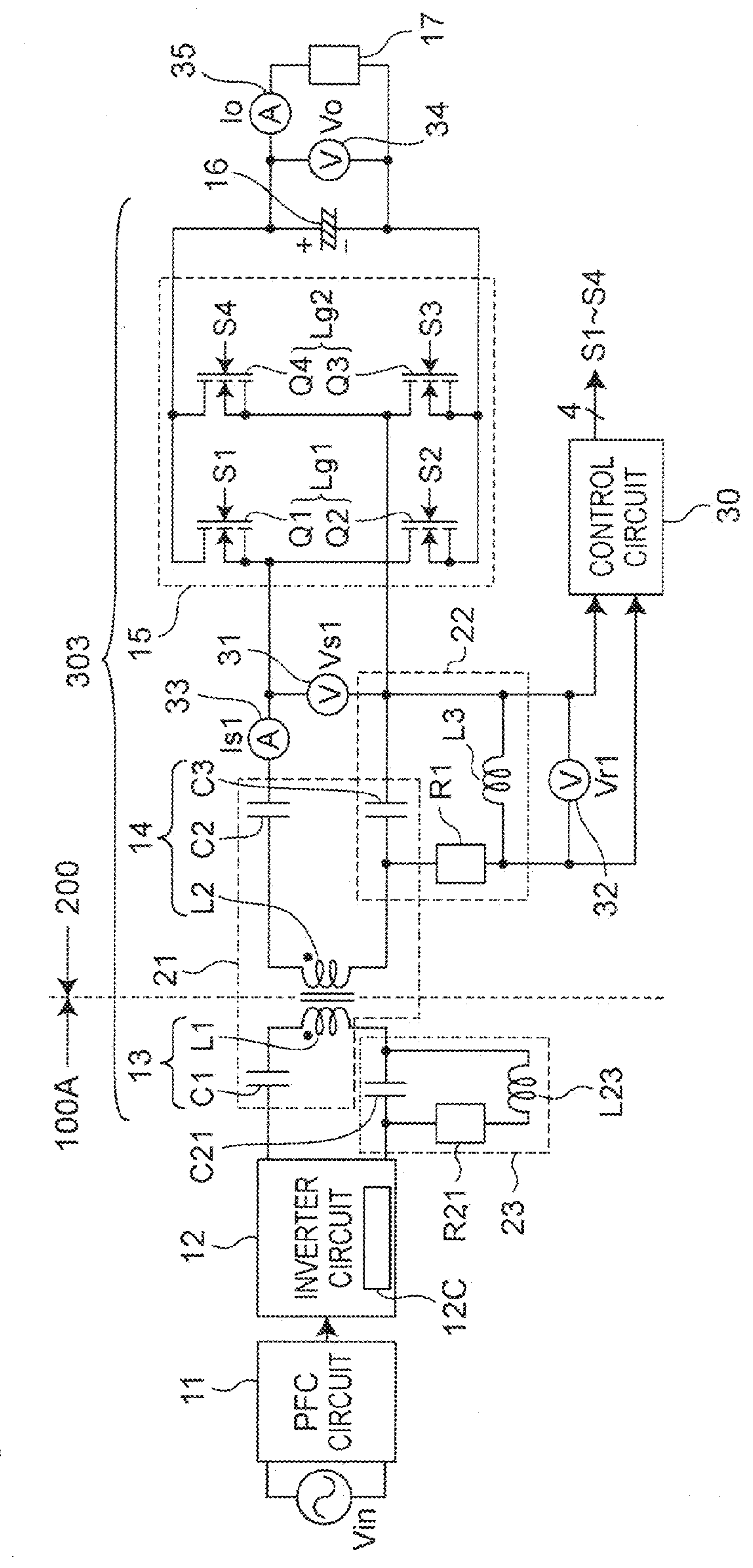
FIG. 7 is a block diagram illustrating a configuration example of a contactless power supply system according to a fourth embodiment.

FIG. 7 is a block diagram illustrating a configuration example of a contactless power supply system according to a fourth embodiment. The contactless power supply system according to the fourth embodiment is different from the contactless power supply system according to the first embodiment in FIG. 1 in the following points.

(1) A power transmitter device 100A is provided instead of the power transmitter device 100.

(2) The power transmitter device 100A further includes a third resonance circuit 23.

Differences will be described below.

Referring to FIG. 7, the resonance circuits 13, 14, and 22, the inverter circuit 15, the electrolytic capacitor 16, and the control circuit 30 configure an insulated resonance circuit device 303 according to the present invention. In addition, the third resonance circuit 23 is connected in series to an LC resonance circuit 13 and is configured to include a series circuit of a resistor R21, an inductor L23, and a capacitor C21. The third resonance circuit 23 is configured to have a resonance frequency substantially identical to a switching frequency fsw of an inverter circuit 12, and the oscillation current oscillating so as to follow the output voltage from the inverter circuit 12 flows in the third resonance circuit 23, so that the oscillation state of the LC resonance circuit 13 can be stabilized. A control method of a control circuit 30 may be either a control method A or a control method B.

The function and effect according to the fourth embodiment configured as described above are as follows.

In the power transmitter device 100 of the first embodiment in FIG. 1, since the switching frequency of the power transmitter device 100 is fixed, there is a problem that the power conversion efficiency deteriorates due to fluctuation of the inductance L (k) that changes depending on the coupling degree k.

Therefore, according to the contactless power supply system according to the fourth embodiment, since the third resonance circuit 23 can follow the change in the resonance frequency fsr of the power transmitter device 100A due to the variation in the inductance L (k) that changes with the coupling degree k without the tracking control of the switching frequency fsw of the inverter circuit 12, it is possible to improve the power conversion efficiency between the power transmitter device 100A and the power receiver device 200 without the wireless communication system.

In the fourth embodiment, in a manner similar to that of the third embodiment, a plurality of second resonance circuits 22 and 22A and inverter circuits 15 and 15A according to the power receiver device 200A may be included.

Modified Embodiments and the Like

Modified embodiments and the like of the LC resonance circuits 13 and 14 in the first resonance circuit 21 will be described below. The following inductors include a self-inductance, an excitation inductance, a leakage inductance, or the like, and L31, L41, and L42 mean that inductors different from these inductors are provided. In addition, the following configuration example is merely a circuit of a basic form, and the number of inductors and capacitors connected in series or in parallel may be changed.

Figure 8A:
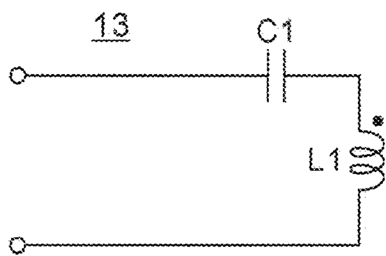

FIG. 8A is a circuit diagram illustrating a configuration example of the LC resonance circuit 13 of FIG. 1 and the like. Referring to FIG. 8A, the LC resonance circuit 13 is a resonance circuit according to the first to fourth embodiments and is configured to include a series circuit of an inductor L1 and a capacitor C1. In this case, the LC resonance circuit 13 of the power transmitter device 100, 100A may be configured to include any one of the following LC resonance circuits 13A to 13E.

Figure 8B:
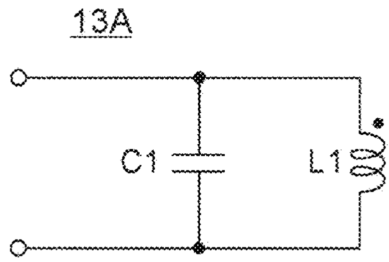
FIG. 8B is a circuit diagram illustrating a configuration example of an LC resonance circuit 13A according to a modified embodiment 1.

FIG. 8B is a circuit diagram illustrating a configuration example of the LC resonance circuit 13A according to a modified embodiment 1. Referring to FIG. 8B, the LC resonance circuit 13A is configured to include a parallel circuit of the inductor L1 and the capacitor C1.

Figure 8C:
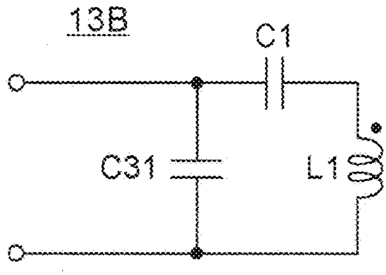
FIG. 8C is a circuit diagram illustrating a configuration example of an LC resonance circuit 13B according to a modified embodiment 2.

FIG. 8C is a circuit diagram illustrating a configuration example of the LC resonance circuit 13B according to a modified embodiment 2. Referring to FIG. 8C, the LC resonance circuit 13B is configured to include a parallel circuit of a series circuit of the inductor L1 and the capacitor C1 and a capacitor C31.

Figure 8D:
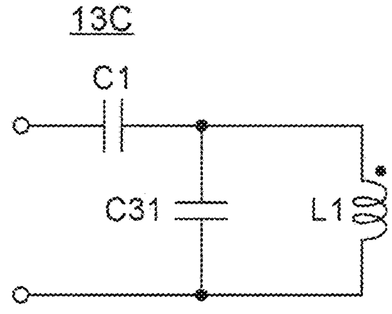
FIG. 8D is a circuit diagram illustrating a configuration example of an LC resonance circuit 13C according to a modified embodiment 3.

FIG. 8D is a circuit diagram illustrating a configuration example of the LC resonance circuit 13C according to a modified embodiment 3. Referring to FIG. 8D, the LC resonance circuit 13C is configured to include a series circuit of a parallel circuit of the inductor L1 and the capacitor C31 and the capacitor C1.

Figure 8E:
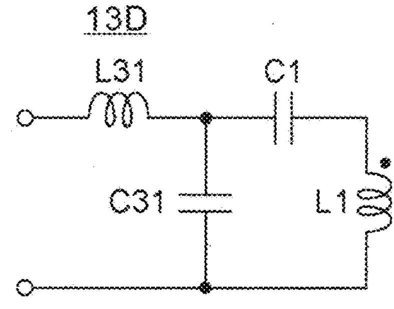
FIG. 8E is a circuit diagram illustrating a configuration example of an LC resonance circuit 13D according to a modified embodiment 4.

FIG. 8E is a circuit diagram illustrating a configuration example of the LC resonance circuit 13D according to a modified embodiment 4. Referring to FIG. 8E, the LC resonance circuit 13D is configured to include an inductor L31 connected in series to a parallel circuit of the capacitor C31, and a series circuit of the inductor L1 and the capacitor C1.

Figure 8F:
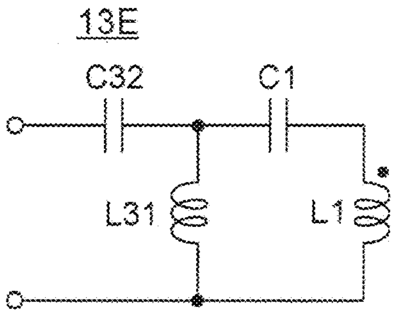
FIG. 8F is a circuit diagram illustrating a configuration example of an LC resonance circuit 13E according to a modified embodiment 5.

FIG. 8F is a circuit diagram illustrating a configuration example of the LC resonance circuit 13E according to a modified embodiment 5. Referring to FIG. 8F, the LC resonance circuit 13E is configured to include a capacitor C32 connected in series to a parallel circuit of the inductor L31, and a series circuit of the inductor L1 and the capacitor C1.

As is clear from FIG. 8A to FIG. 8F, the LC resonance circuit 13, 13A to 13E may be configured to include at least one inductor and at least one capacitor, and each inductor and each capacitor are connected in series or in parallel.

In addition, each of the LC resonance circuit 14 and 14A of the power receiver device 200 and 200A may be configured to include any one of the following LC resonance circuits 14B to 14G.

Figure 9A:
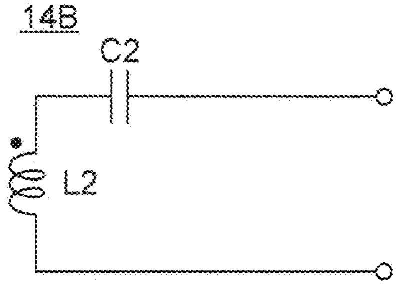
FIG. 9A is a circuit diagram illustrating a configuration example of an LC resonance circuit 14B according to a modified embodiment 6.

FIG. 9A is a circuit diagram illustrating a configuration example of the LC resonance circuit 14B according to a modified embodiment 6. Referring to FIG. 9A, the LC resonance circuit 14B is configured to include a series circuit of an inductor L2 and a capacitor C2.

Figure 9B:
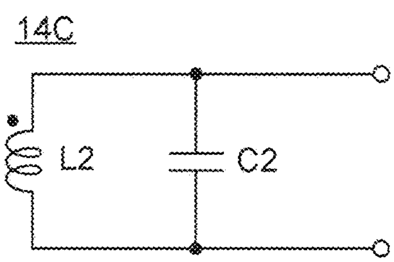
FIG. 9B is a circuit diagram illustrating a configuration example of an LC resonance circuit 14C according to a modified embodiment 7.

FIG. 9B is a circuit diagram illustrating a configuration example of the LC resonance circuit 14C according to a modified embodiment 7. Referring to FIG. 9B, the LC resonance circuit 14C is configured to include a parallel circuit of the inductor L2 and the capacitor C2.

Figure 9C:
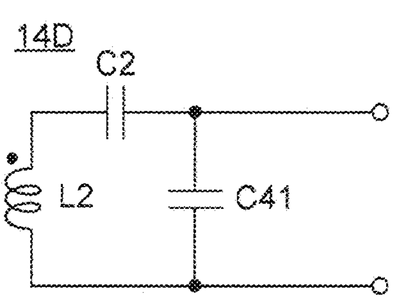
FIG. 9C is a circuit diagram illustrating a configuration example of an LC resonance circuit 14D according to a modified embodiment 8.

FIG. 9C is a circuit diagram illustrating a configuration example of the LC resonance circuit 14D according to a modified embodiment 8. Referring to FIG. 9C, the LC resonance circuit 14D is configured to include a parallel circuit of a series circuit of the inductor L2 and the capacitor C2 and the capacitor C41.

Figure 9D:
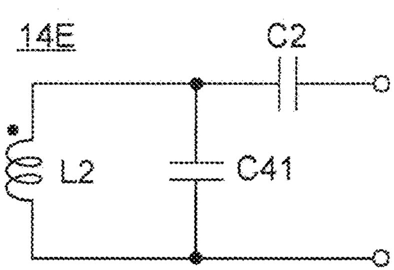
FIG. 9D is a circuit diagram illustrating a configuration example of an LC resonance circuit 14E according to a modified embodiment 9.

FIG. 9D is a circuit diagram illustrating a configuration example of the LC resonance circuit 14E according to a modified embodiment 9. Referring to FIG. 9D, the LC resonance circuit 14E is configured to include a series circuit of a parallel circuit of the inductor L2 and the capacitor C41 and the capacitor C2.

Figure 9E:
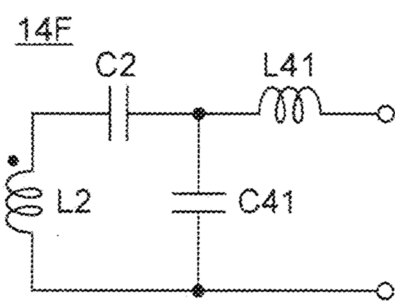
FIG. 9E is a circuit diagram illustrating a configuration example of an LC resonance circuit 14F according to a modified embodiment 10.

FIG. 9E is a circuit diagram illustrating a configuration example of the LC resonance circuit 14F according to a modified embodiment 10. Referring to FIG. 9E, the LC resonance circuit 14F is configured to include an inductor L41 connected in series to a parallel circuit of the capacitor C41, and a series circuit of the inductor L2 and the capacitor C2.

Figure 9F:
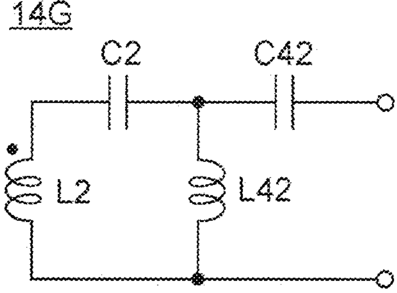
FIG. 9F is a circuit diagram illustrating a configuration example of an LC resonance circuit 14G according to a modified embodiment 11.
Figure 10:
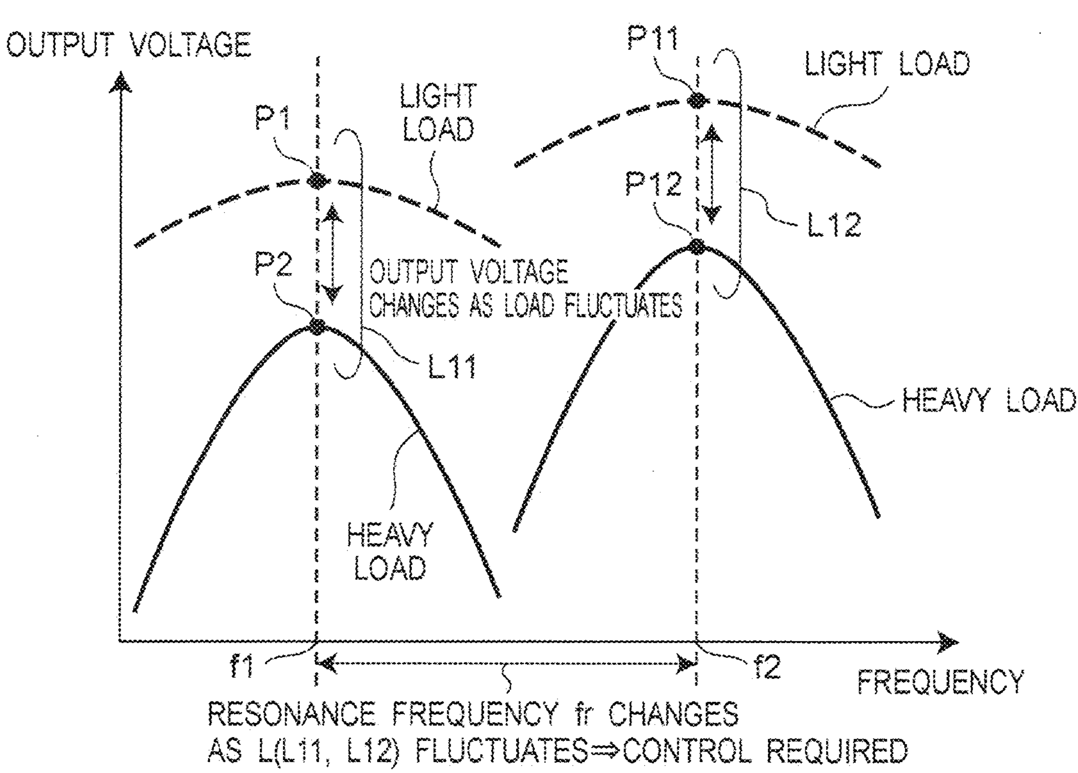
FIG. 10 is a graph showing a frequency spectrum of an output voltage in a contactless power supply system for describing problems according to the prior art.

FIG. 9F is a circuit diagram illustrating a configuration example of the LC resonance circuit 14G according to a modified embodiment 11. Referring to FIG. 9F, the LC resonance circuit 14G is configured to include a capacitor C42 connected in series to a parallel circuit of an inductor L42, and a series circuit of the inductor L2 and the capacitor C2.

As is clear from FIG. 9A to FIG. 9F, the LC resonance circuits 14B to 14G may be configured to include at least one inductor and at least one capacitor, where each inductor and each capacitor are connected in series or in parallel.

INDUSTRIAL APPLICABILITY

The contactless power supply system according to the above embodiment can be applied to, for example, a power transfer system for a moving body such as an AGV or an EV, and a power transfer system for a pallet of a production line. In addition, the present embodiment is also effective in an application in which the distance between power transmission and receiving does not change, and can be applied to, for example, a non-contact slip ring of a non-contact power supply device used in place of a slip ring (rotating body) used for a robot arm or the like.

Furthermore, the resonance circuit according to the above embodiment can be applied to a power supply device or the like using the LC resonance circuit, and even if the value of the inductor or the capacitor is not as designed due to product variations or the like, the resonance frequency can be adjusted to a predetermined value in an actual machine in accordance with variations in the inductor value and/or the capacitor value.

The invention claimed is:

1. An insulated resonance circuit device comprising:

a first resonance circuit that includes a pair of LC resonance circuits including first and second LC resonance circuits electromagnetically coupled to each other and electrically insulated from each other, is configured to oscillate at a predetermined first resonance frequency based on an input AC voltage, and generate and output an oscillation signal voltage;

a rectifier circuit that includes a plurality of switching elements, and is configured to switch the oscillation signal voltage according to a plurality of predetermined gate signals, then smooth the oscillation signal voltage, and output a predetermined DC voltage to a load;

a second resonance circuit electrically connected in parallel with the second LC resonance circuit of the first resonance circuit and provided independently from the first resonance circuit, the second resonance circuit having a second resonance frequency identical to the first resonance frequency, is configured to resonate with the oscillation signal voltage to detect the oscillation signal voltage, and output the detected oscillation signal voltage; and a control circuit configured to compare the oscillation signal voltage from the second resonance circuit with a comparison signal voltage for obtaining a predetermined target output voltage and/or a predetermined target output current to generate the plurality of gate signals for controlling the rectifier circuit and output the plurality of gate signals to the rectifier circuit.

2. The insulated resonance circuit device as claimed in claim 1, further comprising an inverter circuit that is provided at a preceding stage of the first resonance circuit, includes a plurality of switching elements, and is configured to switch an input voltage according to a plurality of predetermined gate signals and then output the AC voltage after the switching to the first resonance circuit, wherein the control circuit is configured to generate a predetermined reference signal based on an oscillation signal voltage from the second resonance circuit, compare the reference signal with the comparison signal voltage to calculate a phase difference between a plurality of gate signals of the inverter circuit and a plurality of gate signals of the rectifier circuit, generate a plurality of gate signals of the rectifier circuit based on the calculated phase difference, and control the rectifier circuit to operate with the phase difference using the generated plurality of gate signals of the rectifier circuit, thereby obtaining the target output voltage and/or the target output current.

3. The insulated resonance circuit device as claimed in claim 1, wherein the rectifier circuit includes:

a pair of first and second switching elements belonging to a first leg; and a pair of third and fourth switching elements belonging to a second leg, wherein the first and fourth switching elements are high-side switching elements, and the second and third switching elements are low-side switching elements, wherein the first to fourth switching elements are configured by being connected in a bridge form, and wherein the control circuit includes:

an integrator configured to generate a predetermined synchronization signal voltage synchronized with an oscillation signal voltage based on the oscillation signal voltage from the second resonance circuit, a comparator configured to compare the synchronization signal voltage with the comparison signal voltage, and generate first and third gate signals identical to each other and output the first and third gate signals to control terminals of the first and third switching elements, respectively, when the synchronization signal voltage reaches the comparison signal voltage, and an inverter configured to invert the first gate signal, generates second and fourth gate signals identical to each other, and output the second and fourth gate signals to control terminals of the second and fourth switching elements, respectively.

4. The insulated resonance circuit device as claimed in claim 1, wherein the rectifier circuit includes:

a pair of first and second switching elements belonging to a first leg; and a pair of third and fourth switching elements belonging to a second leg, wherein the first and fourth switching elements are high-side switching elements, and the second and third switching elements are low-side switching elements, wherein the first to fourth switching elements are configured by being connected in a bridge form, and wherein the control circuit is configured to generate a predetermined reference signal based on an oscillation signal voltage from the second resonance circuit, compare the reference signal with the comparison signal voltage, calculate a phase difference between corresponding switching elements between the first and second legs, generate the plurality of gate signals based on the calculated phase difference, thereby obtaining the target output voltage and/or the target output current.

5. The insulated resonance circuit device as claimed in claim 1, wherein the control circuit comprises:

an integrator configured to generate a synchronization signal voltage synchronized with an oscillation signal voltage from the second resonance circuit;

a first comparator configured to output, as a first gate signal, a reference signal voltage synchronized with the oscillation signal voltage to a control terminal of the first switching element based on the oscillation signal voltage from the second resonance circuit;

a first inverter configured to invert the first gate signal, generate a second gate signal, and output the second gate signal to a control terminal of the second switching element;

a second comparator configured to compare the synchronization signal voltage with the comparison signal voltage, generate a third gate signal and output the third gate signal to a control terminal of the third switching element when the synchronization signal voltage reaches the comparison signal voltage; and a second inverter configured to invert the third gate signal, generate a fourth gate signal, and output the fourth gate signal to a control terminal of the fourth switching element.

6. The insulated resonance circuit device as claimed in claim 1, further comprising:

at least one further rectifier circuit that includes a plurality of switching elements, and switches the oscillation signal voltage according to a predetermined plurality of further gate signals, then is configured to smooth the oscillation signal voltage, and output a predetermined DC voltage to the load; and at least one further second resonance circuit that has a second resonance frequency identical to the first resonance frequency, is configured to resonate with the oscillation signal voltage to detect the oscillation signal voltage, and output the detected oscillation signal voltage, wherein the control circuit is further configured to compare an oscillation signal voltage from the further second resonance circuit with the comparison signal voltage, generate the plurality of further gate signals for controlling the further rectifier circuit, and output the plurality of further gate signals to the further rectifier circuit.

7. The insulated resonance circuit device as claimed claim 1, further comprising a third resonance circuit that is connected to the first LC resonance circuit, has a resonance frequency identical to a frequency of the input AC voltage, and is configured to resonate with the AC voltage.

8. The insulated resonance circuit device as claimed in claim 1, wherein the second resonance circuit including a resistor, an inductor and a capacitor which are serially connected with each other, the capacitor being that of the second LC resonance circuit of the first resonance circuit.

9. A contactless power supply system comprising:

a power transmitter device that transmits an AC voltage;

a power receiver device that is electromagnetically coupled to the power transmitter device and receives the AC voltage; and an insulated resonance circuit device, wherein the insulated resonance circuit device comprises:

a first resonance circuit that includes a pair of LC resonance circuits including first and second LC resonance circuits electromagnetically coupled to each other and electrically insulated from each other, is configured to oscillate at a predetermined first resonance frequency based on an input AC voltage, and generate and output an oscillation signal voltage;

a rectifier circuit that includes a plurality of switching elements, and is configured to switch the oscillation signal voltage according to a plurality of predetermined gate signals, then smooth the oscillation signal voltage, and output a predetermined DC voltage to a load;

a second resonance circuit electrically connected in parallel with the second LC resonance circuit of the first resonance circuit and provided independently from the first resonance circuit, the second resonance circuit having a second resonance frequency identical to the first resonance frequency, is configured to resonate with the oscillation signal voltage to detect the oscillation signal voltage, and output the detected oscillation signal voltage; and a control circuit configured to compare the oscillation signal voltage from the second resonance circuit with a comparison signal voltage for obtaining a predetermined target output voltage and/or a predetermined target output current to generate the plurality of gate signals for controlling the rectifier circuit, and output the plurality of gate signals to the rectifier circuit, wherein the power transmitter device includes the first LC resonance circuit, and wherein the power receiver device includes the second LC resonance circuit, the second resonance circuit, the rectifier circuit, and the control circuit.

10. The contactless power supply system of claim 9, wherein the second resonance circuit including a resistor, an inductor and a capacitor which are serially connected with each other, the capacitor being that of the second LC resonance circuit of the first resonance circuit.

11. A contactless power supply system comprising:

a power transmitter device configured to transmit an AC voltage;

a power receiver device that is electromagnetically coupled to the power transmitter device, and is configured to receive the AC voltage; and an insulated resonance circuit device, wherein the insulated resonance circuit device comprises:

a first resonance circuit that includes a pair of LC resonance circuits including first and second LC resonance circuits electromagnetically coupled to each other and electrically insulated from each other, is configured to oscillate at a predetermined first resonance frequency based on an input AC voltage, and generate and output an oscillation signal voltage;

a rectifier circuit that includes a plurality of switching elements, and is configured to switch the oscillation signal voltage according to a plurality of predetermined gate signals, then smooth the oscillation signal voltage, and output a predetermined DC voltage to a load;

a second resonance circuit electrically connected in parallel with the second LC resonance circuit of the first resonance circuit and provided independently from the first resonance circuit, the second resonance circuit having a second resonance frequency identical to the first resonance frequency, is configured to resonate with the oscillation signal voltage to detect the oscillation signal voltage, and output the detected oscillation signal voltage;

a control circuit configured to compare the oscillation signal voltage from the second resonance circuit with a comparison signal voltage for obtaining a predetermined target output voltage and/or a predetermined target output current to generate the plurality of gate signals for controlling the rectifier circuit, and output the plurality of gate signals to the rectifier circuit;

at least one further rectifier circuit that includes a plurality of switching elements, and switches the oscillation signal voltage according to a predetermined plurality of further gate signals, then is configured to smooth the oscillation signal voltage, and output a predetermined DC voltage to a load; and at least one further second resonance circuit that has a second resonance frequency identical to the first resonance frequency, is configured to resonate with the oscillation signal voltage to detect the oscillation signal voltage, and output the detected oscillation signal voltage, wherein the control circuit is further configured to compare an oscillation signal voltage from the further second resonance circuit with the comparison signal voltage, generate the plurality of further gate signals for controlling the further rectifier circuit, and output the plurality of further gate signals to the further rectifier circuit, wherein the power transmitter device includes the first LC resonance circuit, and wherein the power receiver device includes the second LC resonance circuit, the second resonance circuit, the rectifier circuit, the further second resonance circuit, the further rectifier circuit, and the control circuit.

12. The contactless power supply system of claim 11, wherein the second resonance circuit including a resistor, an inductor and a capacitor which are serially connected with each other, the capacitor being that of the second LC resonance circuit of the first resonance circuit.

13. A contactless power supply system comprising:

a power transmitter device configured to transmit an AC voltage;

a power receiver device that is electromagnetically coupled to the power transmitter device, and is configured to receive the AC voltage; and an insulated resonance circuit device, wherein the insulated resonance circuit device comprises:

a first resonance circuit that includes a pair of LC resonance circuits including first and second LC resonance circuits electromagnetically coupled to each other and electrically insulated from each other, is configured to oscillate at a predetermined first resonance frequency based on an input AC voltage, and generate and output an oscillation signal voltage;

a rectifier circuit that includes a plurality of switching elements, and is configured to switch the oscillation signal voltage according to a plurality of predetermined gate signals, then smooth the oscillation signal voltage, and output a predetermined DC voltage to a load;

a second resonance circuit electrically connected in parallel with the second LC resonance circuit of the first resonance circuit and provided independently from the first resonance circuit, the second resonance circuit having a second resonance frequency identical to the first resonance frequency, is configured to resonate with the oscillation signal voltage to detect the oscillation signal voltage, and output the detected oscillation signal voltage;

a control circuit configured to compare the oscillation signal voltage from the second resonance circuit with a comparison signal voltage for obtaining a predetermined target output voltage and/or a predetermined target output current to generate the plurality of gate signals for controlling the rectifier circuit, and output the plurality of gate signals to the rectifier circuit; and a third resonance circuit that is connected to the first LC resonance circuit, has a resonance frequency identical to a frequency of the input AC voltage, and is configured to resonate with the AC voltage, wherein the power transmitter device includes the first LC resonance circuit and the third resonance circuit, and wherein the power receiver device includes the second LC resonance circuit, the second resonance circuit, the rectifier circuit, and the control circuit.

14. The contactless power supply system of claim 13, wherein the second resonance circuit including a resistor, an inductor and a capacitor which are serially connected with each other, the capacitor being that of the second LC resonance circuit of the first resonance circuit.

* * * * *